United States Patent [19]

Matsushima

[11] Patent Number: 4,930,149
[45] Date of Patent: May 29, 1990

[54] CORDLESS TELEPHONE COMMUNICATION SYSTEM

[75] Inventor: Kouji Matsushima, Kawasaki, Japan

[73] Assignee: Fujitsu Limited, Kawasaki, Japan

[21] Appl. No.: 406,564

[22] Filed: Sep. 13, 1989

[30] Foreign Application Priority Data

Sep. 13, 1988 [JP] Japan ................................ 63-229264

[51] Int. Cl.$^5$ .............................................. H04B 7/26
[52] U.S. Cl. ......................................... 379/61; 379/58
[58] Field of Search ...................... 379/61, 62, 63, 58; 455/34

[56] References Cited

U.S. PATENT DOCUMENTS

| | | | |
|---|---|---|---|
| 4,491,382 | 11/1984 | Villa Real | 379/61 |
| 4,591,661 | 5/1986 | Benedetto et al. | 379/61 |
| 4,627,098 | 12/1986 | Dolikian et al. | 455/70 |
| 4,745,632 | 5/1988 | Duffy | 379/58 |
| 4,775,995 | 10/1988 | Chapman et al. | 379/58 |
| 4,853,951 | 8/1989 | Bauer | 379/62 |

FOREIGN PATENT DOCUMENTS 63-222527  9/1988  Japan .

Primary Examiner—Robert Lev
Attorney, Agent, or Firm—Staas & Halsey

[57] ABSTRACT

A cordless telephone communication system having a handset unit and base unit connected by a radio transmission channel, the base unit being connected to a remote telephone through a public telephone line, of the base unit and handset unit, at least the base unit having provided therein a detection unit and semi-mute unit, the detection unit sending out a detection output when the handset unit is positioned outside a service area, the semi-mute unit reducing the level of the received signals when the detection output is given, the remote party being expected to take the natural action of waiting without hanging up the telephone while this reduction in level continues.

9 Claims, 8 Drawing Sheets

CORDLESS TELEPHONE COMMUNICATION SYSTEM

BACKGROUND OF THE INVENTION

1. Field of the Invention

The present invention relates to a cordless telephone communication system, more particularly relates to the construction of a base unit and handset unit in a cordless telephone communication system.

Along with the spread of cordless telephones in recent years, a demand has arisen for improvement of communication services in the case of use of cordless telephones in weak electrical fields.

2. Description of the Related Art

In conventional cordless telephone communication systems, when one leaves the position of the fixed base unit and brings the handset unit outside of the service area, strong FM noise is heard in the remote telephone connected via the public telephone line. To eliminate this, the transmission of the voice signal from the base unit to the public telephone line is completely muted to give a non-sound status to the remote telephone.

In such a cordless telephone communication system, when the remote telephone is in the non-sound state, there is the problem that the remote party connected on the line cannot determine if there is no sound since the party on the handset unit side has gone out of the service area or there is no sound since the line has been disconnected.

SUMMARY OF THE INVENTION

Therefore, the present invention has as its object to make it possible for a remote party to confirm that the line is still connected even if the handset unit has been taken out of the service area.

The above-mentioned object is achieved by the present invention by the provision in at least the base unit out of the base unit and handset unit of a detection means for detecting the positioning of the handset unit out of the service area and a semi-mute means for reducing the RF received signal to a level lower than the normal received signal level by the detection output of the detection means.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the related art and the disadvantages therein will be described with reference to the related figures.

Figure 1:
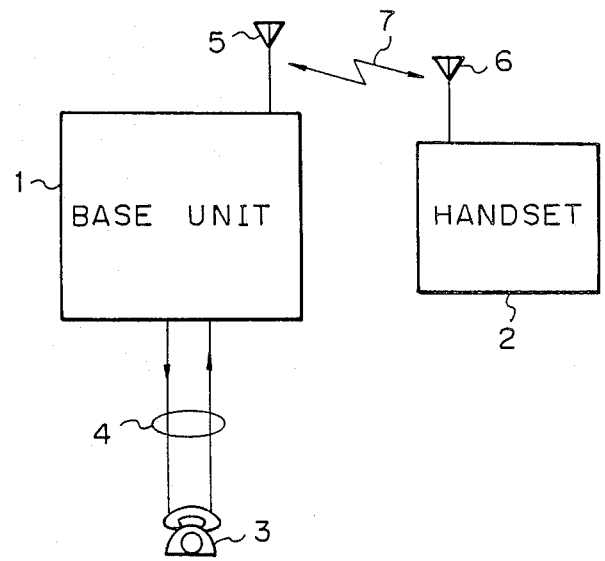
FIG. 1 is a view of the outline of a general cordless telephone communication system.

FIG. 1 is a view of the outline of a general cordless telephone communication system. In the figure, reference numeral 1 is a fixed base unit which transmits and receives signals to and from a handset unit 2 through an RF transmission line 7. For this purpose, antennas 5 and 6 are provided, respectively. On the other hand, the base unit 1 transmits and receives signals to and from a remote telephone set 3 through a public telephone line 4. That is, two parties engage in a conversation using the handset unit 2 and telephone set 3.

The fixed base unit 1 and handset unit 2 are provided as a pair of units in, for example, a floor of an office or in the general home. In this case, the handset unit 2 may be used for conversation within, for example, a radius of 100 meters of the base unit 1, in what is called the "service area."

When the handset unit 2 is moved away from the base unit 1, however, and goes out of the service area, the FM noise increases rapidly. Therefore, it becomes impossible to maintain normal conversation. This may occur even when the handset unit 2 is within a 100 meter radius of the base unit 1. For example, this may occur when there are obstructions (walls etc.) between the base unit 1 and the handset unit 2. At this time too, the handset unit 2 is considered to be positioned out of the service area. The FM noise becomes large and normal conversation also cannot be maintained.

In general, FM noise is a strong sound and is unpleasant to the other party. Therefore, in the past, when the FM noise becomes large, the base unit 1 has muted the signal to the public telephone line 4. That is, the remote telephone set 3 receives no sound.

The party of the telephone set 3 on the other end of the public telephone line 4, however, cannot know if the party on the public telephone line 4 is using a cordless telephone communication system. This being the case, when sound is cut off from the telephone set 3, the party there cannot know if the line connection has been broken and may end up hanging up the telephone even if the line is still connected. This is not desirable in terms of the service of a cordless telephone communication system. Note that the party on the handset unit 2 side is aware he is using a cordless telephone, so when there is no response from the remote telephone set 3 due to the non-sound state being in effect, will know that there is no response from the telephone due not to the line connection being broken, but due to his being outside of the service area. Therefore, the problem is the reduction of service to the telephone set 3.

Figure 2:
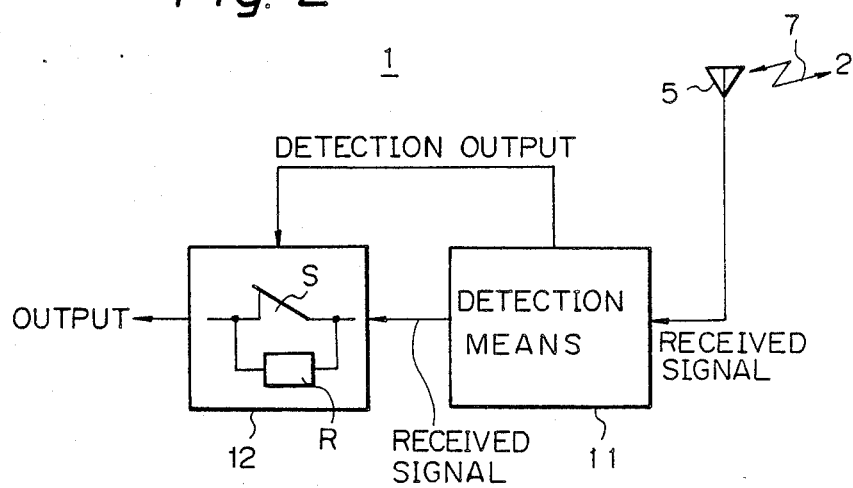
FIG. 2 is a view of the principle of the present invention as applied to a base unit.

FIG. 2 is a view of the principle of the present invention as applied to a base unit. In the figure, reference numeral 11 is a detection means, which detection means 11 detects if the handset unit 2 is out of the service area by the signals received from the handset unit 2. Reference numeral 12 is a semi-mute means, which semi-mute means 12 reduces the level of the received signals to lower than the level of the received signals in the case where the handset unit 2 is in the service area by the detection output from the detection means 11. In the figure, the detection means 11 is shown as a parallel circuit of a switch S and resistor R in concept. When there is no detection signal from the detection means 11, the switch S is conductive, as shown in the figure, and the received signals are not semi-muted. On the other hand, when the handset unit 2 is out of the service area and the FM noise becomes large, a detection output is given from the detection means 11 and the switch S becomes nonconductive. As a result, the received signal falls in level due to the resistor R and is semi-muted. The point of the present invention is that in this case, full muting is not performed, i.e., the received signals are not completely blocked.

Figure 3:
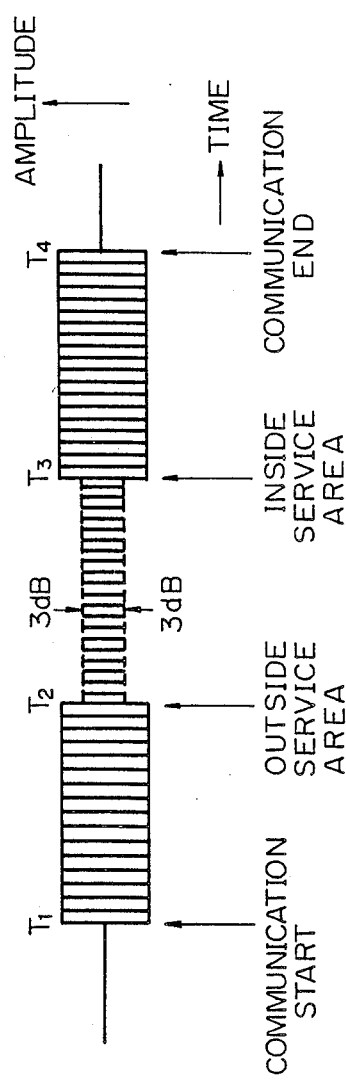
FIG. 3 shows the level transition of a received signal for explaining the operation of the present invention.

FIG. 3 shows the level transition of a received signal for explaining the operation of the present invention. In the figure, the abscissa indicates the elapsed time and the ordinate the amplitude, for example, the amplitude of the voice signal level. The solid line portion shows the average level. The handset unit 2 moves with the party holding it when he or she walks through the office or in the room. In the figure, the transitions are shown when the conversation begins at a time T1, the handset unit 2 is moved out of the service area at the time T2, the handset unit 2 is returned to the service area at the time T3, and the conversation ends at the time T4.

In the figure, in the interval from the time T2 to T3, the handset unit 2 is outside of the service area. In the conventional system, the received signals would be fully muted since the FM noise would become large. In the present invention, however, in T2 to T3, the signals are semi-muted. Therefore, a semi-muted sound is supplied to the remote telephone set 3. This includes almost no understandable sounds and is almost all noise. However, this noise is semi-muted and is not unpleasant to the other party. What is important is that the other party hears a semi-muted sound and therefore can understand that communication with the handset unit 2 is still being maintained. In the past system, there was no semi-muted sound and no sound at all was heard, so the party on the telephone set 3 would mistakenly consider that the line connection was broken and hang up the telephone. Note that the level of the received signals outside the service area (T2 to T3) is made lower than the level of the received signals in the service area (T1 to T2 and T3 to T4) by an amount on the order of about 6 (=3+3) dB.

Figure 4:
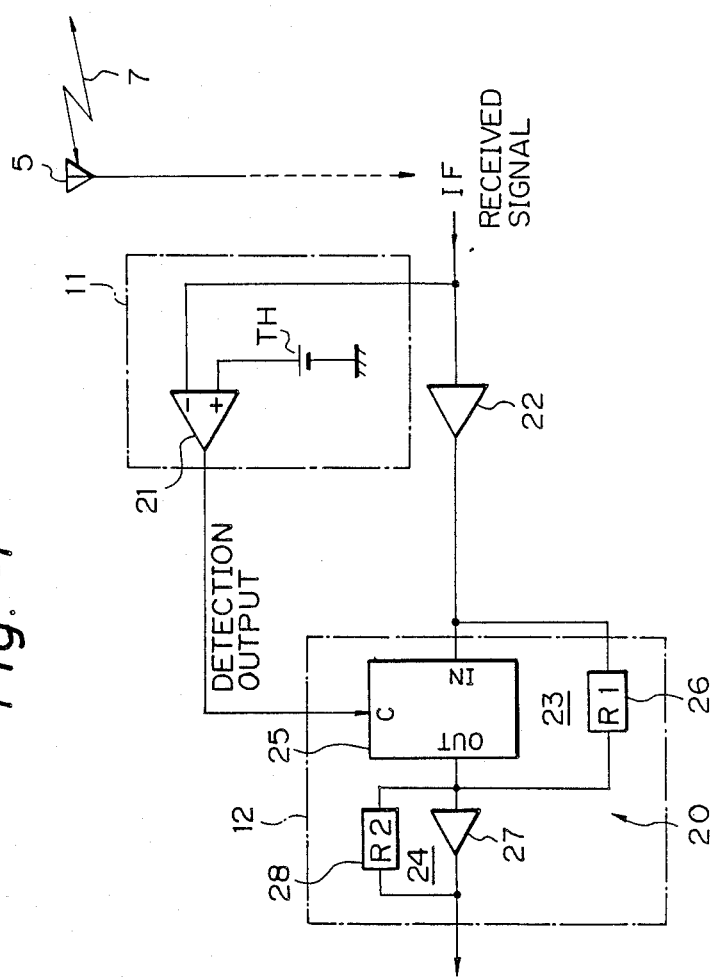
FIG. 4 is a circuit diagram showing in more detail the blocks of FIG. 2.

FIG. 4 is a circuit diagram showing in more detail the blocks of FIG. 2. In the figure, the detection means 11 includes a comparator 21 provided in parallel with an amplifier 22 for amplifying the IF received signals. The comparator 21 transmits a detection output when the level of the IF received signals has fallen lower than a predetermined threshold level TH.

The semi-mute means 12 is constituted as a gain control means 20, which gain control unit 20 controls the gain with respect to the IF received signals output from the IF amplifier 22 and sets the gain high in the normal communication mode and low when the detection output is transmitted from the comparator 21.

The gain control unit 20 includes a first circuit (23) having a first resistor (R1) 26 and an analog switch 25 connected in parallel and a second circuit 24 having a second resistor (R2) and operational amplifier 27 connected in parallel, the two circuits being connected in series.

In the first circuit 23 which receives as input the IF received signals, by making the analog switch 25 conductive or not conductive, the resistance value of the first resistor 26 is changed to be low or high, respectively, thereby switching the level of the gain. Here, the analog switch 25 becomes non-conductive only when the detection output is transmitted from the comparator 21. That is, the gain becomes low and the level of the IF received signals is made low.

Note that the IN of the analog switch 25 is the input terminal of the signals, the OUT is the output terminal of the signals, and C is the control terminal for designating the conductive or non-conductive state of the analog switch 25. When an "L" (low) level is applied to the control terminal C, it becomes non-conductive.

Figure 5A:
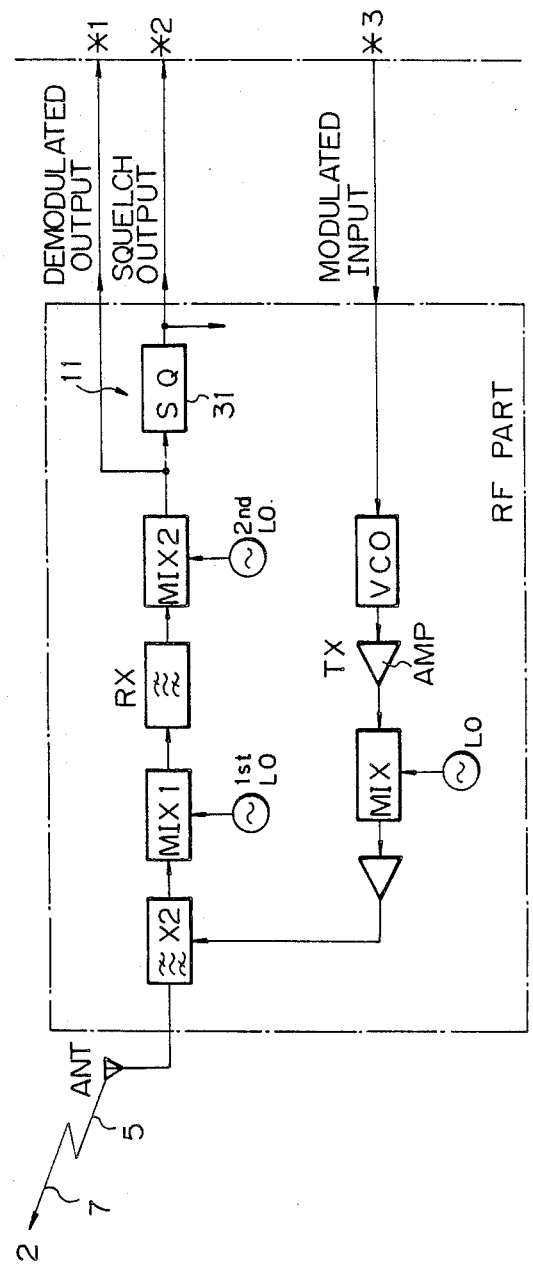
FIG. 5A and FIG. 5B are circuit diagrams showing an embodiment of a base unit based on the present invention.
Figure 5B:
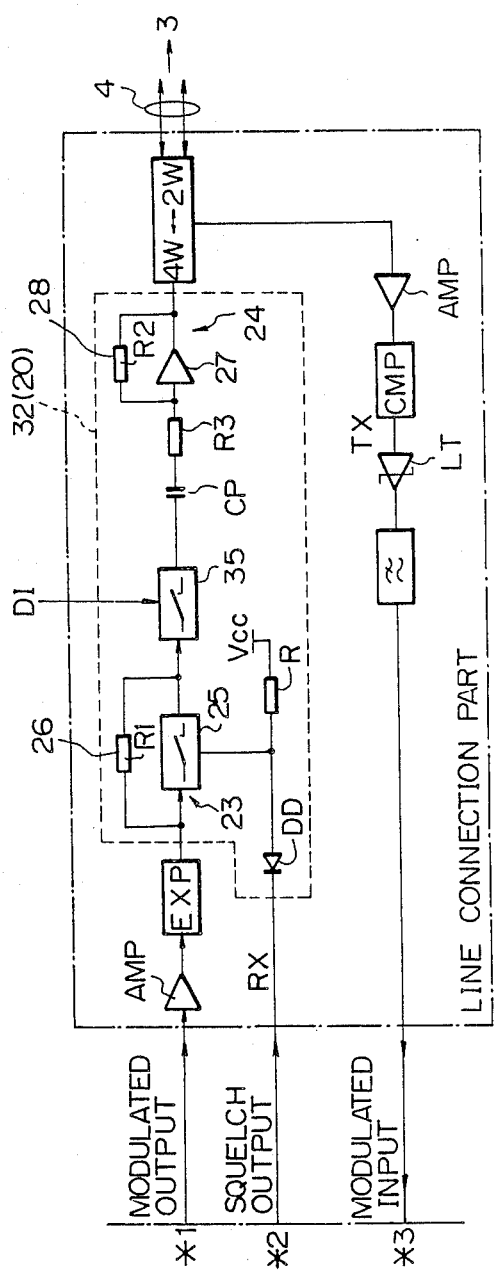

FIG. 5A and FIG. 5B are circuit diagrams showing an embodiment of a base unit based on the present invention. FIG. 5A shows the radio frequency (RF) part in the base unit 1, while FIG. 5B shows the line connection part in the base unit 1. The detection means 11 is realized as a squelch circuit (SQ) 31 in FIG. 5A, while the semi-mute means 12 is realized as a gain control unit 32 in FIG. 5B. Note that the unit 32 is a further detailed view of the gain control unit 20 shown in FIG. 4. Corresponding constituent elements are given the same reference numerals and symbols. The symbol R in the unit 32 shows a resistor, CP a capacitor, and DD a diode. Reference numeral 35 is another analog switch and constitutes a full mute circuit. This analog switch 35 becomes conductive when the dialing information DI is generated and completely cuts off voice signals.

Figure 6:
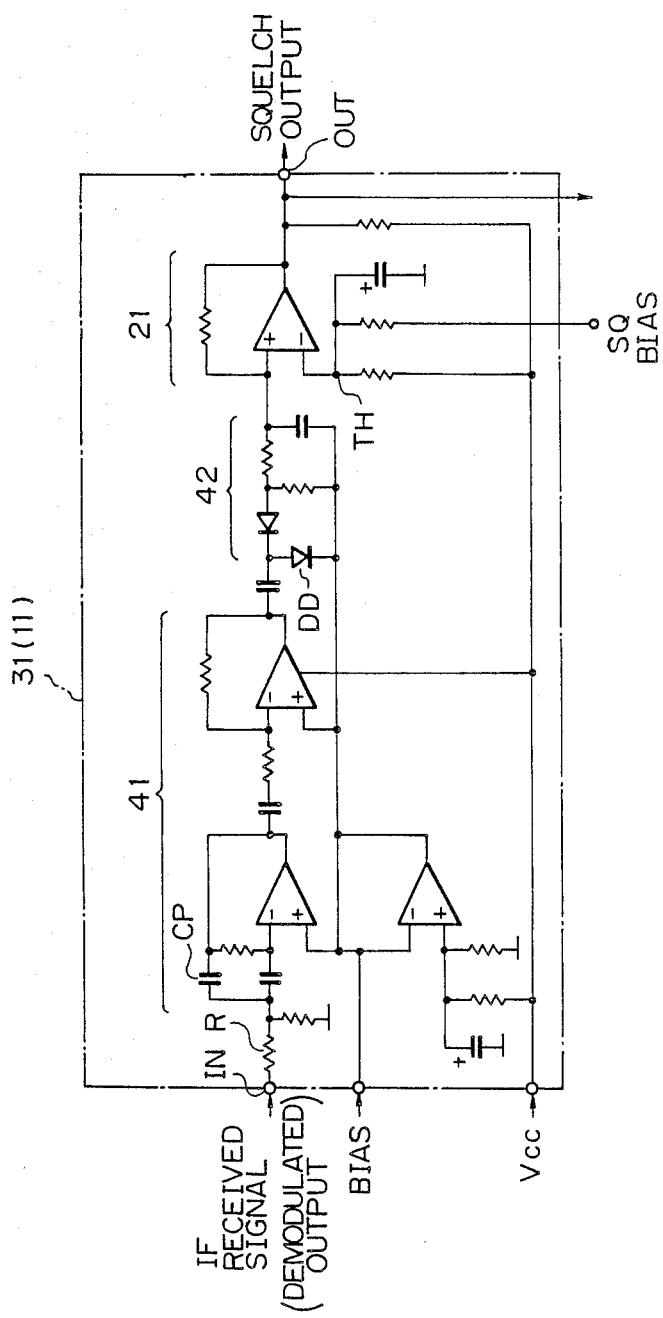
FIG. 6 is a circuit diagram showing a detailed example of a squelch circuit of FIG. 5A.

FIG. 6 is a circuit diagram showing a detailed example of the squelch circuit of FIG. 5A. The left end of the figure shows the input port IN, while the right end shows the output port OUT. Between the input port IN and output port OUT are connected in series a filter circuit 41 (constituted by two stages of operational amplifiers), a rectifier circuit 42, and a comparator (in FIG. 4, shown by reference numeral 21). Note that the symbols with the letters R, CP, and DD appended are resistors, capacitors, and diodes.

When the handset unit 2 is in the service area, a demodulated output is applied to the input stage of the squelch circuit 31 from the input port IN, and the comparator 21 of the output stage gives an "H" (high) level output to the output port OUT.

When the handset unit 2 is in the service area, FM noise is applied to the input stage of the squelch circuit 31 from the input port IN, and the comparator 21 of the output stage gives an "L" (low) level output to the output port OUT. This FM noise is caught by the filter circuit 41. The output of the filter circuit 41 is half-wave rectified by a rectifier circuit 42, and the non-inverting input (+) level of the operational amplifier forming the comparator 21 is reduced more and more. Further, when the threshold level TH is exceeded, the "L" level is output. Note that the squelch circuit 31 is usually inherently included in an FM cordless telephone.

Figure 7:
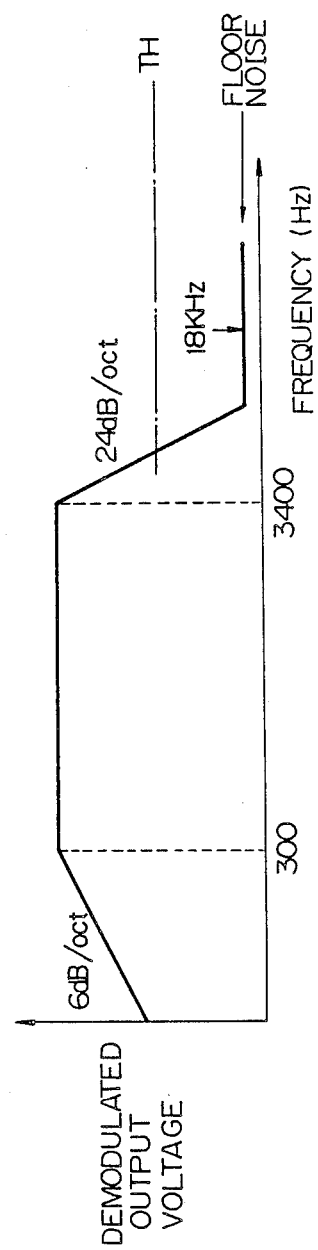
FIG. 7 is a graph of the general frequency characteristics of a signal applied to an input port IN of FIG. 6.

FIG. 7 is a graph of the general frequency characteristics of a signal applied to an input port IN of FIG. 6. The abscissa shows the frequency (Hz), and the ordinate the voltage level of the demodulated output. The voltage level is the sum of the noise voltage and the voice signal voltage. Among the noise components, the FM noise outside of the speech band (300 Hz to 3400 Hz) (for example, near 18 kHz) is extracted by the filter circuit 41. When the FM noise level exceeds the threshold level TH (TH of FIG. 4 and FIG. 6), the handset unit 2 is treated as being out of the service area. Note that the noise component included in the demodulated output becomes weak when the field intensity from the handset unit 2 is strong and is conversely large when the field intensity is small. This is a general characteristic of FM noise.

Referring to FIG. 5B, an explanation will now be made of the gain control unit 32 (20). When the squelch output of FIG. 5A is the "H" level, that is, when the handset unit 2 is in the service area, the diode (DD of FIG. 5B) becomes off and the analog switch 25 is made conductive. This being so, the gain G of the gain control unit 32 becomes $$G = R2/R3$$

On the other hand, when the handset unit 2 is outside the service area, the squelch output is the "L" level and the diode (DD in FIG. 5B) turns on, so the analog switch 25 becomes nonconductive. At this time, the gain G, of the gain control unit 32 becomes $$G' = R3/(R1+R2)$$

Comparing the gain G and G', G>G'. Outside of the service area, the gain G' is lowered and the reduction of the level at the time T2 to T3 of FIG. 2 is produced.

Returning again to FIGS. 5A and 5B, first, in FIG. 5A, the upper half shows the receiver side RX and the lower half the transmitter side TX. The receiver side RX includes a bandpass filter, a first mixer and first local oscillator LO for obtaining IF received signals, another bandpass filter for extracting only the IF received signal component, and a second mixer MIX2 and second local oscillator LO for demodulation.

In the receiver side RX of FIG. 5B, the modulated output from the RF part is received by the amplifier AMP and then applied to a usual expander EXP, then supplied to the above-mentioned gain control unit 32. Finally, it is sent to a public telephone line 4 through a two-wire-four-wire conversion hybrid coil (4W−2W).

The signals from the remote telephone set 3 are separated at the transmitter side TX by the hybrid coil (4W−2W) and input to the transmitter side TX of FIG. 5A as modulated input through a usual amplifier AMP, compander CMP, limiter LT, and low pass filter. It is then passed through the usual voltage controlled oscillator VCO, amplifier AMP, local oscillator for converting to a RF signal, and mixer MIX to the handset unit 2 by an antenna 5.

Figure 8:
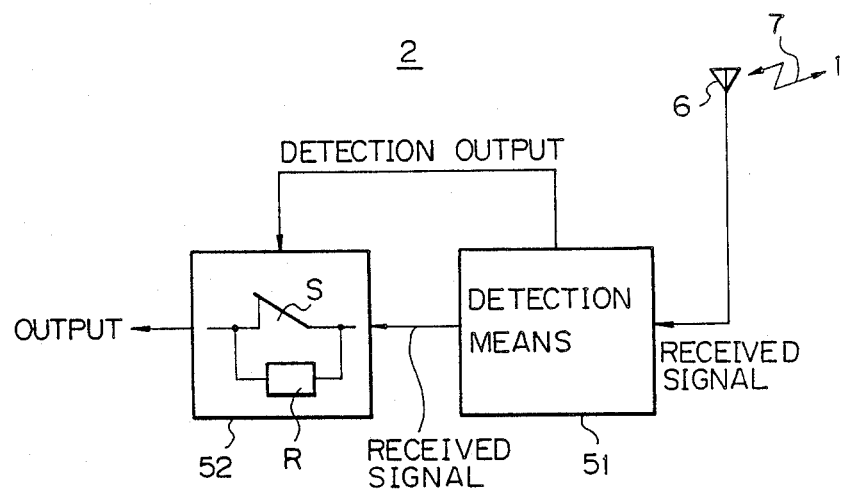
FIG. 8 is a view of the principle of the present invention as applied to a handset unit.

FIG. 8 is a view of the principle of the present invention as applied to a handset unit. The present invention is most effective when applied to the base unit 1. More preferably, it may be applied also to the handset unit 2. When the party on the handset unit 2 notes a change in the reception level as shown in the time T2 to T3 of FIG. 2, he can determine that he or she is positioned outside of the service area. Therefore, he will know that the remote party cannot easily hear his voice. Therefore, it becomes necessary to begin to move the handset unit 2 back into the service area quickly. At this time, the remote party may wait without hanging up.

A detection means 51 and a semi-mute means 52 provided in the handset unit 2 are of exactly the same construction as the detection means 11 and semi-mute means 12 shown in FIG. 2. Therefore, the content explained from FIG. 3 to FIG. 7 applies as is to the means 51 and 52 as well.

As explained above, according to the present invention, first, a party on a remote telephone set 3 can determine that the line connection with the handset unit 2 is maintained. Second, the party on the handset unit 2 can know that he is outside the service area. Third, communication outside the service area is generally hampered by a high level of FM noise which is harsh and unpleasant sounding, but this FM noise is reduced to a low level, so there is no problem.

I claim:

1. A cordless telephone communication system wherein provision is made of a base unit and a handset unit connected to said base unit through a radio transmission channel and communication is performed between a remote telephone set and said handset unit through a public telephone line connected to said base unit, wherein provision is made in the said base unit of:
   a detection means which detects if the handset unit is out of a service area by signals received from said handset unit and
   a semi-mute means for reducing the level of said received signals to lower than the level of said received signals in the case where the handset unit is within the service area by detection output from said detection means.

2. A system as set forth in claim 1, wherein said detection means is comprised of an IF amplifier which amplifies the IF received signals and a comparator provided in parallel with the same, said comparator sending out said detection output when the level of the said IF received signals falls below a predetermined threshold level.

3. A system as set forth in claim 2, wherein said semi-mute means is constituted by a gain control unit and said gain control unit controls the gain with respect to said IF received signals output from said IF amplifier, the gain being set high in the normal communication mode and low when said detection output is sent out from said comparator.

4. A system as set forth in claim 3, wherein said gain control unit is constituted by connecting in series a first circuit comprising a first resistor and analog switch connected in parallel and a second circuit comprising a second resistor and operational amplifier connected in parallel,
   in the said first circuit to which are input the said IF received signals, the said analog switch is made conductive or nonconductive so as to change the resistance value of the said first resistor lower or higher, the said analog switch becoming nonconductive only when detection output is sent out from said comparator.

5. A system as set forth in claim 4, wherein said detection means is constituted by a squelch circuit and said comparator is formed at an output stage of said squelch circuit.

6. A system as set forth in claim 5, wherein said analog switch and another analog switch are connected in series, the latter analog switch being a full mute circuit and becoming nonconductive when a dial signal is transmitted.

7. A system as set forth in claim 3, wherein said gain control unit reduces the gain when said detection output is sent out from the gain at the normal communication mode by an amount on the order of about 6 dB.

8. A system as set forth in claim 4, wherein said gain control unit is comprised of said first circuit, a capacitor, a third resistor, and said second circuit as a series circuit, the conductive or nonconductive state of the analog switch in said first circuit being controlled by the provision of a diode inserted between it and the output of said comparator, the analog switch being made conductive to form a first gain (G) when the output of the said comparator is the "H" level and the said analog switch being made nonconductive to form a second gain (G') when the output is an "L" level, wherein $G=R3/R2$ and $G'=R3/(R1+R2)$ stand.

9. A system as set forth in claim 1, wherein:
a detection means for detecting if said handset unit is outside the service area by signals received from said base unit and a semi-mute means for reducing the level of said received signals lower than a level of said received signals in the case where the said handset unit is in the service area by detection output from said detection means are both further provided in said handset unit.

* * * * *